(12) United States Patent
Hariharan (10) Patent No.: US 9,055,633 B2
(45) Date of Patent: Jun. 9, 2015

(54) LOAD COMPENSATION FOR AN ELECTRONIC TRANSFORMER IN A LED ILLUMINATION SYSTEM

(75) Inventor: Suresh Hariharan, Livermore, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 292 days.

(21) Appl. No.: 13/584,184

(22) Filed: Aug. 13, 2012

(65) Prior Publication Data
US 2013/0049617 A1 Feb. 28, 2013

Related U.S. Application Data

(60) Provisional application No. 61/526,857, filed on Aug. 24, 2011.

(51) Int. Cl.
*H05B 37/00* (2006.01)
*H05B 33/08* (2006.01)

(52) U.S. Cl.
CPC ........... *H05B 33/0815* (2013.01); *Y02B 20/348* (2013.01)

(58) Field of Classification Search
USPC .......... 315/200 R, 201–207, 209 R, 224, 291, 315/307, 272, 352
See application file for complete search history.

(56) References Cited

U.S. PATENT DOCUMENTS

| | | | |
|---|---|---|---|
| 2009/0251059 A1* | 10/2009 | Veltman | 315/200 R |
| 2012/0062141 A1* | 3/2012 | Riesebosch | 315/291 |
| 2013/0049619 A1* | 2/2013 | Gray et al. | 315/201 |

\* cited by examiner

*Primary Examiner* — Douglas W Owens
*Assistant Examiner* — James H Cho
(74) *Attorney, Agent, or Firm* — North Weber & Baugh LLP (57) ABSTRACT

The invention relates to a light emitting diode (LED) illumination system, and more particularly, to systems, devices and methods of rapidly ramping up a transformer current and a LED driver current by coupling a transformer load compensation circuitry to an output of an electronic transformer. A bridge rectifier is coupled to the electronic transformer and provides full-wave rectification to an AC supply at the output of the electronic transformer. The load compensation circuitry senses the rectified AC supply and compensates the load of the electronic transformer, such that the electronic transformer starts up properly when the level of the signal envelope is below a threshold voltage. Therefore, the load compensation circuit is active for a programmed time during which the LED driver current has been increased to a sufficient value to keep the electronic transformer operational.

20 Claims, 6 Drawing Sheets

LOAD COMPENSATION FOR AN ELECTRONIC TRANSFORMER IN A LED ILLUMINATION SYSTEM

CROSS REFERENCE TO RELATED APPLICATION

The application claims the benefit under 35 U.S.C. §119(e) of Provisional Application Ser. No. 61/526,857, entitled "Load Compensation for an Electronic Transformer in a LED Illumination System", filed on Aug. 24, 2011, the subject matter of which is incorporated herein by reference.

BACKGROUND

A. Technical Field

The present invention relates to a light emitting diode (hereinafter, "LED") illumination system, and more particularly, to systems, devices and methods of rapidly ramping up a transformer current and a LED driver current by coupling a transformer load compensation circuitry to an output of an electronic transformer.

B. Background of the Invention

Semiconductor-based solid-state lighting (SSL), until recently associated mainly with simple indicator lamps in electronics and toys, has become as bright and more efficient than other lighting technologies, such as halogen lamps. In particular, the enormous technology improvements have been achieved on light emitting diodes (LEDs) over the past years. LEDs have been available for various wavelengths, and suitable for white illumination. Lifetime of LEDs is also extended to more than 10 thousand hours, and can work at input powers up to many watts.

When compared to halogen lamps, LEDs are relatively smaller, and have a longer operating life. Moreover, LEDs also require significantly less amount of power to operate than a typical halogen lamp, e.g., MR16. For example, a halogen lamp may operate within a range of 20-50 Watts, while an LED at about 5-10 Watts is sufficient to provide a similar level of brightness.

Figure 1:
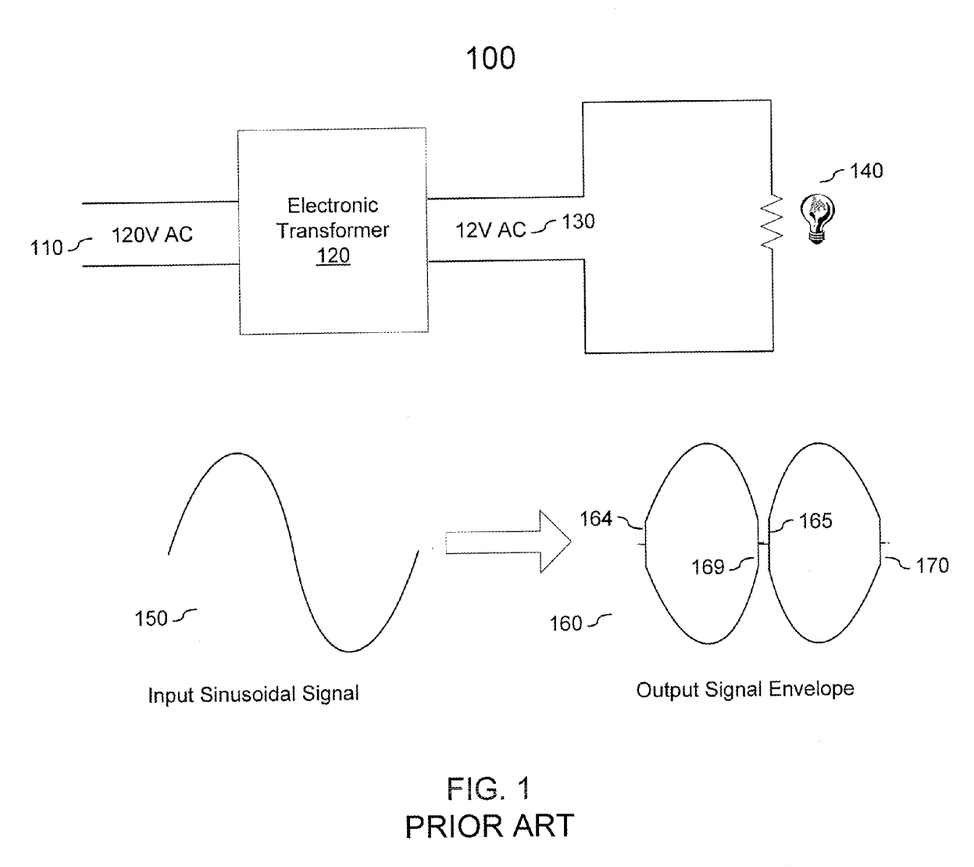
FIG. 1 is a general diagram showing a lighting system using a halogen lamp and an illustration of clipping on an output signal envelope from an electronic transformer.

FIG. 1 illustrates an exemplary illumination system 100 in which a halogen lamp is used. In this example, a high voltage AC signal 110 is delivered to an electronic transformer 120, which converts the signal to a 12V AC signal 130. This 12V AC signal 130 is provided to drive a halogen lamp 140 to generate light.

The conversion of the AC signal by the electronic transformer 120 from a high voltage signal to a 12V signal causes chopping or clipping on the 12V output signal envelope. The AC supply voltage 110 that directly comes from the wall outlet is normally associated with a sinusoidal signal 150 having amplitude of 110V or 220V at 60 Hz. As shown, the electronic transformer 120 converts the AC supply voltage 110 to a high-frequency signal 130 having an associated signal envelope 160. The electronic transformer 120 comprises internal circuitry that starts at an effective turn-on voltage, which causes clipping 164, 165, 169, 170 on both the leading and trailing edges of the signal envelope. Until the input signal 150 reaches a minimum voltage threshold, the electronic transformer is effectively off, which results in this clipped output waveform.

In the illumination system 110, the halogen lamp may be replaced with a LED or a LED string in which LEDs are connected in series. Each power LED in the LED string requires a nominal current anywhere in the range of 35-1400 mA, a forward voltage drop of 3V and large manufacturing tolerances. For a comparable illumination level, a MR16 halogen lamp of 20 W may be replaced with a single 5 W MR16 LED or a 5 W MR16 LED string. Although power consumption and energy efficiency has been largely improved, the low input power level may cause a failure in operation of the electronic transformer 120.

SUMMARY OF THE INVENTION

Various embodiments of the present invention relate to a LED illumination system, and more particularly, to systems, devices and methods of rapidly ramping up a transformer current and a LED driver current by coupling a transformer load compensation circuitry to an output of an electronic transformer.

One aspect of the invention is a LED illumination system that provides a LED current to drive a LED. The LED illumination system comprises an electronic transformer and a LED driver and current regulator. The electronic transformer, coupled to a power outlet, converts a first AC supply to a second AC supply that is contained within a signal envelope, and the frequency of the signal envelop is substantially equal to that of the first AC supply. The LED driver and current regulator is coupled between the electronic transformer and the LED, and generates the LED current from the second AC supply. In the LED driver and current regulator, a bridge rectifier provides full-wave rectification to the second AC supply. Other techniques other than a bridge rectifier can also be used to provide a unipolar voltage to the LED driver circuitry. A load compensation circuitry senses the rectified second AC supply and compensates the load of the electronic transformer, such that the electronic transformer starts up properly and maintains operational when the level of the signal envelope is below a threshold voltage.

Another aspect of the invention is a method of generating a LED current to drive a LED. A first AC supply is converted to a second AC supply that is contained within a signal envelope using an electronic transformer, and the frequency of the signal envelop is substantially equal to that of the first AC supply. The second AC supply is processed with full-wave rectification. The rectified second AC supply is sensed and compensated for compensating the load of the electronic transformer, such that the electronic transformer starts up properly and maintains operational when the level of the signal envelope is below a threshold voltage. The rectified second AC supply is further coupled to drive the LED.

Another aspect of the invention is a driver and current regulator. The driver and current regulator comprises a bridge rectifier and a load compensation circuitry. The bridge rectifier provides full-wave rectification to an input AC supply that is contained in a signal envelope. The input supply is generated by an electronic transformer from a low-frequency AC supply, and the frequency of the signal envelope is substantially equal to that of the low-frequency AC supply. The load compensation circuitry senses the rectified input AC supply and compensates the load of the electronic transformer, such that the electronic transformer starts up properly when the level of signal envelope is lower than a threshold voltage.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the invention relate to a LED illumination system, and more particularly, to systems, devices and methods of rapidly ramping up an input transformer current and a LED driver current by coupling a transformer load compensation circuitry to an output of an electronic transformer. During each cycle of the LED illumination system, the LED driver current and the associated input transformer current ramp up at a limited rate, and may not provide sufficient power for the transformer to start up properly. However, the transformer load compensation circuitry functions as an active load to the electronic transformer providing additional power till the electronic transformer starts up properly on every cycle of the input voltage. The cycle of the input voltage refers to the low frequency envelope of a voltage waveform at the output of the electronic transformer. The envelope and the cycle share a frequency that is twice that of a high voltage AC input to the transformer.

Figure 2:
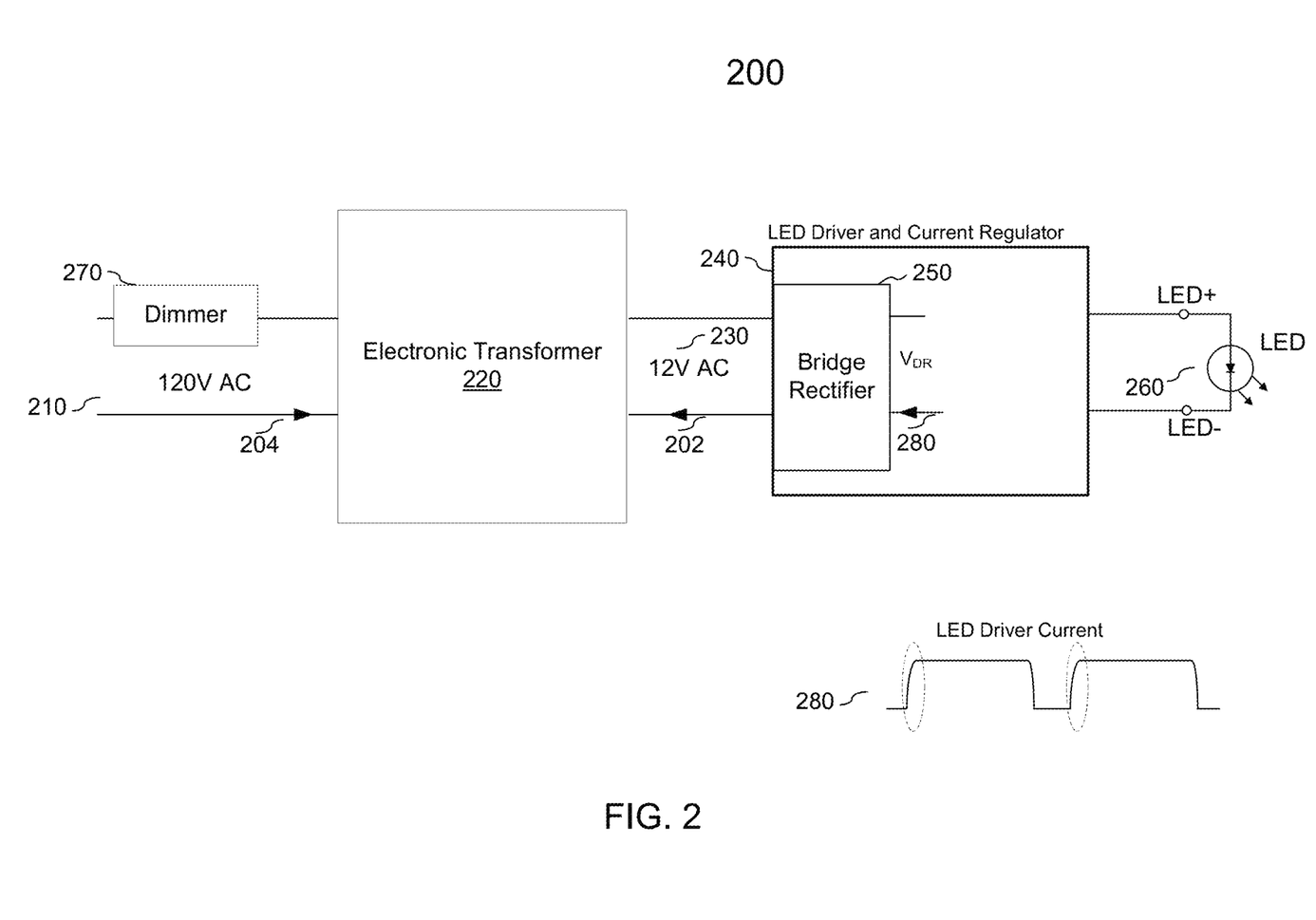
FIG. 2 illustrates an exemplary block diagram of a LED illumination system and an exemplary illustration of gradual current ramp in a LED current according to various embodiments of the invention.

FIG. 2 illustrates an exemplary block diagram 200 of a LED illumination system and an exemplary illustration of gradual current ramp in a LED current according to various embodiments of the invention. The LED illumination system 200 comprises an electronic transformer 220, a LED driver and current regulator 240 and a LED 260. The dimmer control 270 is optional and is used if dimming is required.

As shown, a high voltage (e.g., 120V or 220V) AC is received by the electronic transformer 220. The electronic transformer 220 converts the high voltage signal 210 into a low voltage, 12V AC signal 230. This 12V AC signal 230 is input into the LED driver and current regulator 240 which generates a signal that provides the LED 260 with the appropriate amount of power. The signal may be directly provided to the LED 260. The power level on this signal may also be adjusted by the dimmer control 270 to effectively change the light intensity that is emitted from the LED 260. Therefore, this power conversion from the electronic transformer 220 to an appropriate LED power level is primarily realized by the LED driver and current regulator 240 adjusting a current level being applied to LED nodes (LED+ and LED−) relative to the voltage level on the 12V AC signal 230.

The LED driver and current regulator 240 turns on and off a switch in relation to the voltage level on the 12V AC signal 230 relative to a voltage reference, which in turn defines the amount of power delivered to the LED. In an input average current mode, the LED driver and current regulator 240 converts and integrates the 12V AC signal 230 that is contained within a clipped output signal envelope 160 to a pulsed input current between two LED driving nodes (LED+ and LED−).

At its interface to the electronic transformer 220, the LED driver and current regulator 240 further comprises a bridge rectifier 250 that provides full-wave rectifications and converts the AC signal 410 into a positive signal $V_{DR}$ (i.e., rectified 12V AC signal) by converting both positive and negative swings of the signal into positive half cycles. A LED driver current 280 is generated at the output of the bridge rectifier to drive the LED. The LED driver current 280 is a high frequency current contained in a square-shape current envelope. The LED driver current 280 doubles the frequency of the 12V AC signal at the output of the electronic transformer 220, while its current envelope shares the frequency of the AC signal 210 at the input of the transformer. The magnitude of the LED driver current 280 is determined by the amplitude of the 12V AC signal 230 and the dimmer control 270. The leading and trailing edges in the square-shape current envelope of the LED driver current 280 are synchronous with the edges of the output signal envelope 160. The LED driver control circuit is used to control the LED driver current 280, such that without the dimmer the power delivered to the LEDs is kept substantially constant for changes in an input line.

The input transformer current 204 and the envelope of the transform current 202 adopt a similar shape with the LED driver current 280. However, due to the low power characteristics of the LED 260, the load overseen at the output of the electronic transformer 220 is not sufficient, such that the electronic transformer 220 may not start properly at the leading edge of each pulse. This difficulty in starting up is reflected by the moderate slew rates at the leading edges of the LED driver current 280. Therefore, to ensure a proper transformer startup, alternative load compensation technique is needed at the output of the electronic transformer 220, and the slew rates are enhanced at the leading edges of the LED driver current 280 and the associated transformer currents 202 and 204. This problem does not exist in halogen lamps, because halogen lamps constitute a resistive load to the electronic transformer. The driver current is directly proportional to the voltage of the output voltage from the electronic transformer, and there is no slew rate involved.

Figure 3:
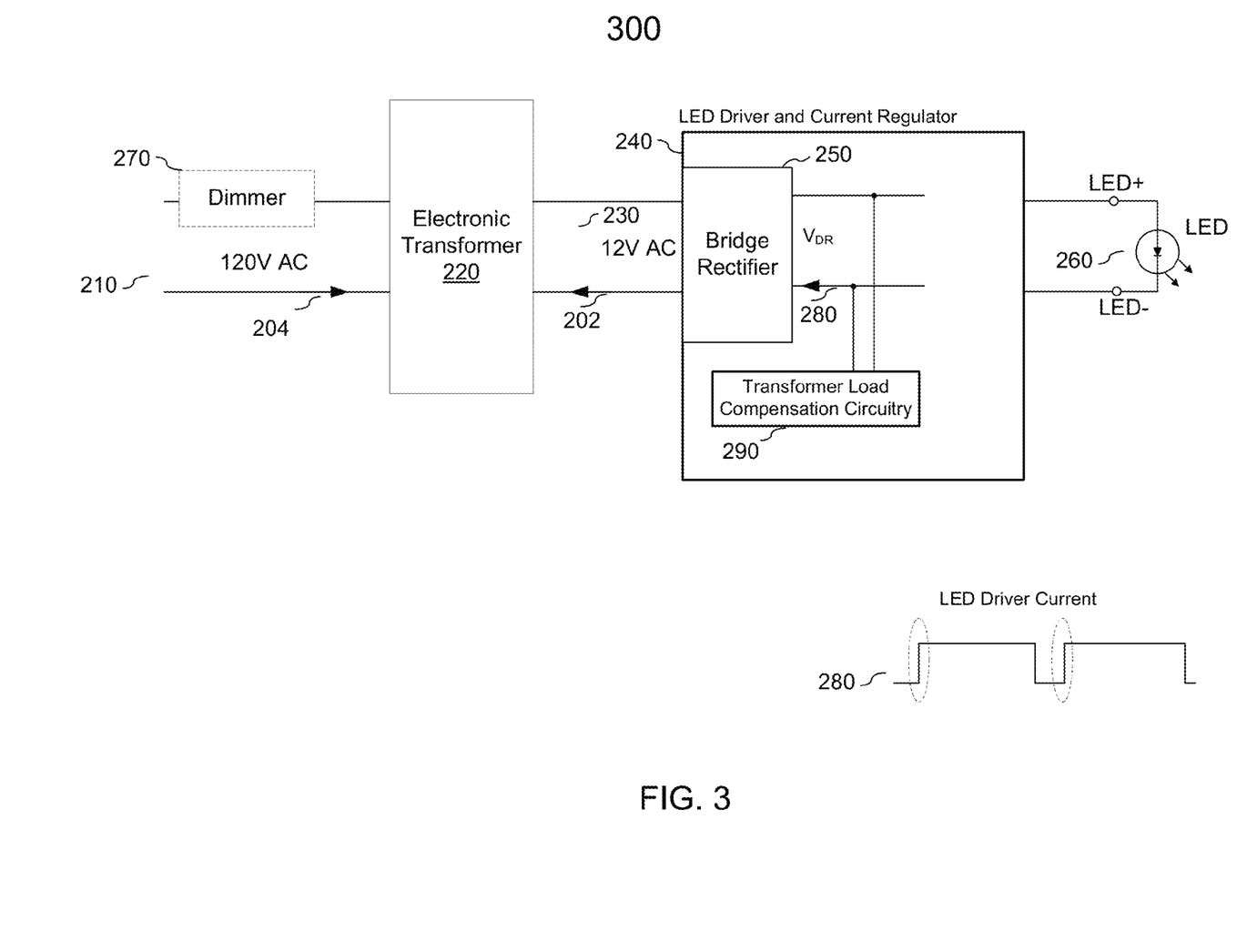
FIG. 3A illustrates an exemplary block diagram of a LED illumination system based on transformer load compensation and an exemplary illustration of a regulated LED current according to various embodiments of the invention.

FIG. 3 illustrates an exemplary block diagram 300 of a LED illumination system based on transformer load compensation and an exemplary illustration of a regulated LED driver current 280 according to various embodiments of the invention. The LED illumination system 300 comprises an electronic transformer 220, a LED driver and current regulator 240, and a LED 260. A transformer load compensation circuitry 290 is incorporated in the LED driver and current regulator 240. In certain embodiments, the load compensation circuitry 290 is coupled to the output of a bridge rectifier 250 located at its interface to the electronic transformer 220. The transformer load compensation circuitry 290 is enabled at the leading edges of the LED driver current 280 to compensate the load at the output of the transformer 220, such that the transformer starts up properly and maintains operational.

As shown, a high voltage (e.g., 120V or 220V) AC signal 210 is converted by the electronic transformer 220 into a low voltage, 12V AC signal 230. This 12V AC signal 230 is input into the LED driver and current regulator 240 which generates a signal (LED+, LED−) that directly drives the LED 260 with an appropriate amount of power.

The transformer load compensation circuitry 290 is coupled to the output of the bridge rectifier 250, senses the rectified 12V AC signal (i.e., $V_{DR}$), and compensates the load of the transformer 220 according to the rectified 12V AC signal. Since the LED driver and transformer currents are associated with the rectified 12V AC signal $V_{DR}$ at the output, the circuitry 290 relies on the voltage level of the rectified 12V AC signal $V_{DR}$ to enable compensation. The rectified 12V AC signal $V_{DR}$ is contained in an envelope similar to the output signal envelop 160 for the 12VAC signal $V_{DR}$. At the leading edges, more specifically, around the clipping edges 164 and 169, the compensation circuitry 290 detects that the voltage level of the rectified 12V AC signal $V_{DR}$ reaches a predetermined threshold, and thereby, enables load compensation. The load compensation circuit is enabled as soon as a voltage level appears at the output of the transformer.

At the leading edges, the transformer load compensation circuitry 290 functions as an additional current sink in addition to the LED 260 prior to the LED driver current reaches a target current. The load is temporarily raised at the output of the transformer 220 by the load compensation circuitry 290. The load compensation circuitry 290 may be based on a resistive circuit or a constant current source, and however, preferably responds quickly within the first 50-100 μsec of each leading edge of the LED driver current 280. Therefore, the electronic transformer 220 is kept from turning off prior to the LED driver current 280 reaches the target level. Basically, the compensation circuitry 290 compensates the load at the output of the transformer by regulating the transformer current 202, and as a result, the slew rate at the leading edges of the LED driver current is increased as well.

In certain embodiments involving adjustment of illumination brightness, the dimmer control 270 may also be used at an input of the transformer 220. The power level on this signal is adjusted by the dimmer control 270 to effectively change the light intensity that is emitted from the LED 260.

One of skills in the art knows that a commonly used electromagnetic interference (EMI) filter is not desirable in the LED illumination system 300. The EMI filter normally relies on capacitors coupled between the LED nodes (LED+ and LED−) to average the LED driver current and reduce high frequency noises. As a result, application of the EMI filter unavoidably aggravates the slew rate of the LED driver current 208, introduces an undesirable load, and may hold the electronic transformer 220 from starting up properly.

Figure 4:
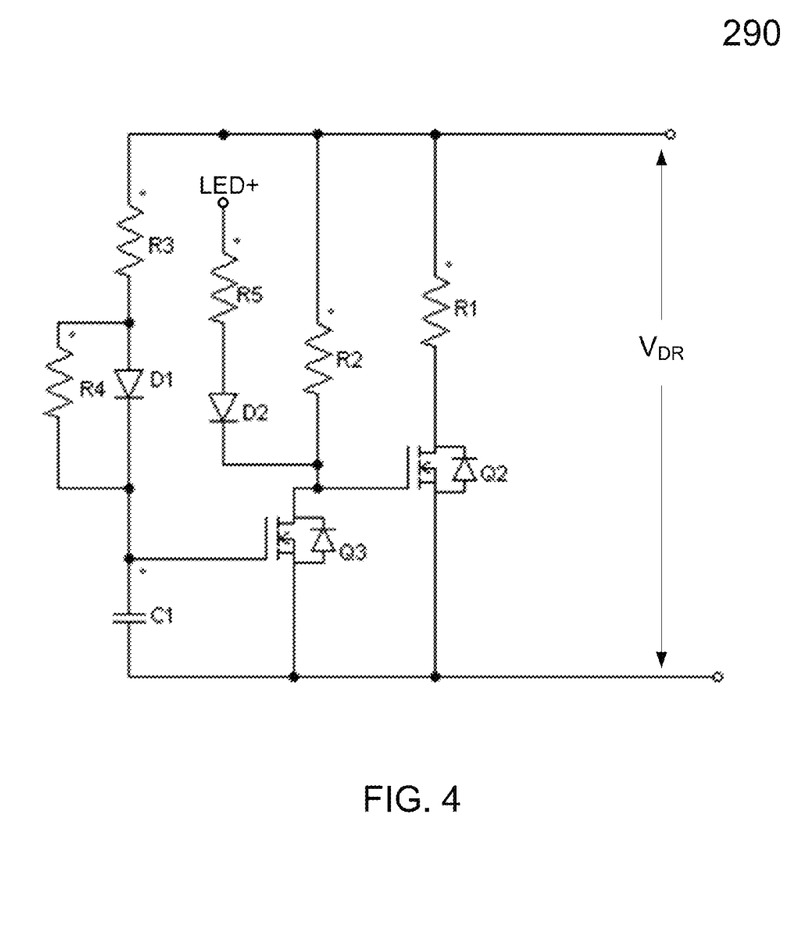
FIG. 4 illustrates exemplary an exemplary block diagram of a transformer load compensation circuitry according to various embodiments of the invention.

FIG. 4 illustrates exemplary an exemplary block diagram 290 of a transformer load compensation circuitry according to various embodiments of the invention. The transformer load compensation circuitry 290 rapidly ramps up the transformer current 202, the input transformer current 204 and the LED driver current 280 at the leading edges. This compensation circuitry 290 is biased between the differential outputs of the diode rectifier 250 that interfaces to the electronic transformer 220, and thus, is coupled to receive the rectified 12V AC signal 230.

This transformer load compensation circuitry 290 is equivalent to a resistive load. The transistors Q2 and Q3 are switches controlled by the level of the 12V AC signal 230, and under different conditions, resistors R1 is coupled as an additional load to the electronic transformer 205. The transistors Q2 and Q3 share a threshold voltage $V_{TH}$, and the diodes D1 and D2 share a diode turn-on voltage. At the leading edge of the LED driver current 280, the envelope of the 12V AC signal 230 ramps up as well. The transistor Q2 is turned on once the level reaches $V_{TH}$, and R1 is loaded to the output of the transformer 220. The time duration for which Q2 is on is controlled by the transistor Q3. Once Q3 is turned on, Q2 is turned off and the load R1 is disabled. The transistor Q3 is controlled by R3, R4, D1 and C1. The values for R4, R3, D1 and C1 are appropriately selected such that Q2 is turned off once the current has reached an appropriate level for proper startup of the electronic transformer. Therefore, the transformer 220 may still start up properly when its load from the LED 260 is insufficient.

The active duration of the load compensation circuitry on every half cycle of the ac input voltage 210 is set by the time constant of the circuit comprising of R3, D1, R4 and C1. When the gate-to-source voltage of Q3 is higher than the threshold voltage $V_{TH}$, the load compensation circuit 290 is disabled. Therefore, the discharge time constant is set by R4, R3 and C1, while the charge time constant is set by R3 and C1.

Figure 5A:
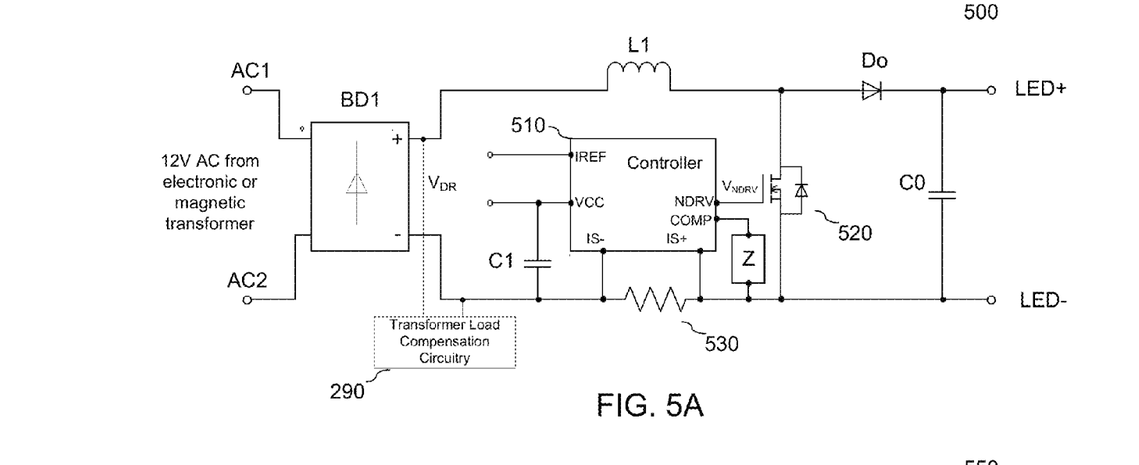
FIG. 5A illustrates an exemplary block diagram of a boost LED driver and current regulator according to various embodiments of the invention.
Figure 5B:
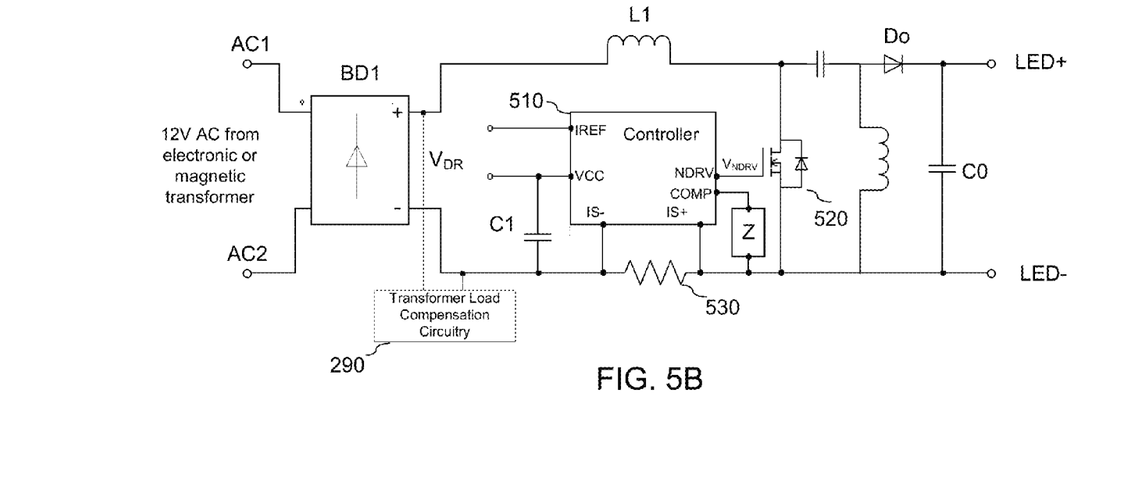
FIG. 5B illustrates an exemplary block diagram of a SEPIC LED driver and current regulator according to various embodiments of the invention.

The transformer load compensation circuitry 290 may be used in a LED illumination system 300 that is based on different LED drivers and current regulators 240. Generally, the LED driver and current regulator 240 controls the switching responses of the current that drives the LED 260, and uses an average input current control to maintain a substantially constant current during the duty cycles. FIG. 5A illustrates an exemplary block diagram 500 of a boost LED driver and current regulator according to various embodiments of the invention, and FIG. 5B illustrates an exemplary block diagram 550 of a SEPIC LED driver and current regulator according to various embodiments of the invention. The boost LED driver 500 and the SEPIC LED driver 550 are used to drive a LED string that comprises more than six LEDs and six or less LEDs, respectively. The transformer load compensation circuitry 290 is compatible with these two exemplary driver/regulator configurations.

Both the boost LED driver 500 and the SEPIC LED driver 550 comprises a diode bridge BD1, a controller 510, a switching transistor 520 and a sensing resistor 530. The diode bridge BD1 is coupled to receive the 12V AC voltage 230, and rectifies the voltage 230 to form a half wave sinusoidal signal $V_{DR}$. The signal $V_{DR}$ is further used as a switched mode power supply to drive the LED 260. A current driving the LED 260 passes through the sensing resistor 530 on its return path. The controller 510 senses the current in the LED by monitoring the bias over the resistor 530, and generates a voltage $V_{NDRV}$ to control the switching transistor 520 between on and off. Thus, the current in the LED may be determined and adjusted by the switching transistor 520. It is apparently that a closed-loop control of the current in the LED is included such that a substantially constant current may be generated to drive the LED 260 from these two LED drivers.

In various embodiments of the invention, the transformer load compensation circuitry 290 is coupled to the bridge rectifier 250 in the LED driver and current regulator 240. As a result, the transformer load compensation circuitry 290 indirectly regulates the transformer current 202 while not interfering with the current that directly drives the LED 260.

Figure 6A:
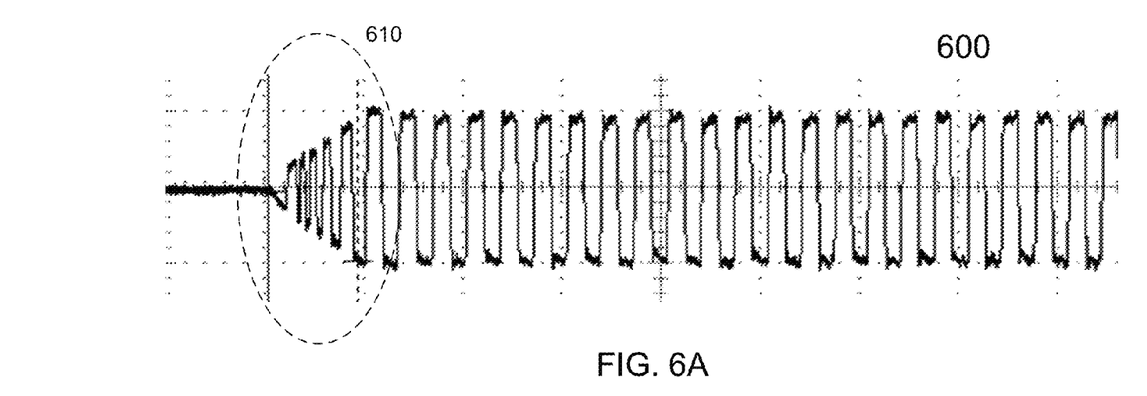
FIGS. 6A and 6B illustrate two exemplary time diagrams of an input transformer current according to various embodiments of the invention.
Figure 6B:
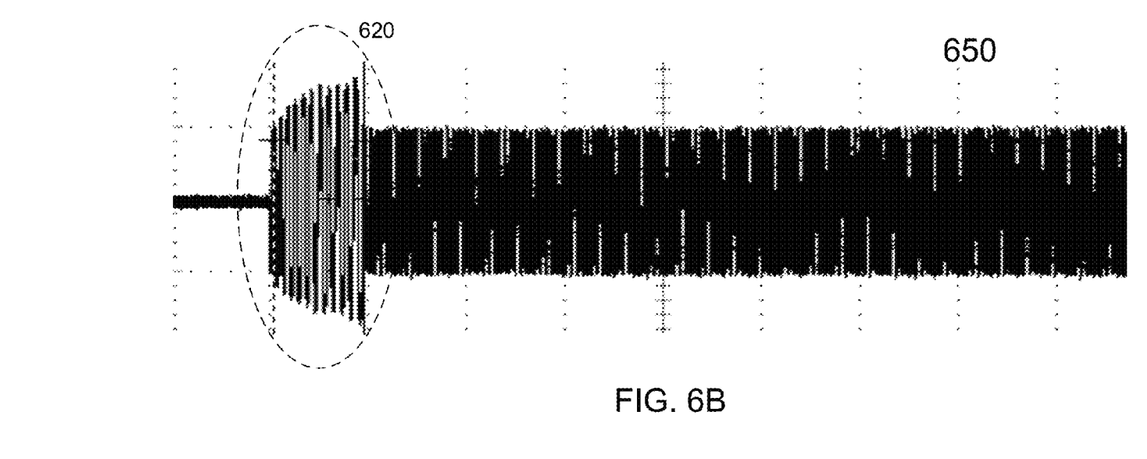

FIGS. 6A and 6B illustrate two exemplary time diagrams 600 and 650 of an input transformer current 204 that is associated with the transformer current 202 according to various embodiments of the invention. The time diagram 600 is associated with a LED illumination system 200 which does not involve load compensation for the transformer. Although certain electronic transformer may result in a proper startup 610 in the input transformer current 204, it is easy for some other electronic transformer to malfunction (i.e., fail to start up) when they are used in such an illumination system 200.

The time diagram 650 is associated with a LED illumination system 300 based on load compensation to the transformer. The transform load compensation circuitry 290 provides additional load to the transformer during the duration that is corresponding to a leading edge of the resulting LED driver current. As a result, the input transformer current 204 ramps up rapidly within time duration 620, and the electronic transformer 220 may start up properly and efficiently. This allowed several other transformers to be compatible with the LED driver board.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

I claim:

1. A light emitting diode (LED) illumination system that provides a LED current to drive a LED, comprising:
   (1) an electronic transformer converting a first AC supply to a second AC supply that is contained within a signal envelope, wherein the frequency of the signal envelope is substantially equal to that of the first AC supply; and
   (2) a LED driver and current regulator, coupled between the electronic transformer and the LED, the LED driver and current regulator generating a LED current contained in a square-shape LED current envelope from the second AC supply and further comprising:
      (a) a bridge rectifier, coupled to the electronic transformer, the bridge rectifier providing full-wave rectification to the second AC supply; and
      (b) a load compensation circuitry, coupled to the bridge rectifier, the load compensation circuitry sensing the rectified second AC supply and compensating the load of the electronic transformer by adjusting a slew rate of at least one of leading and trailing edges of the square-shape LED current envelope.

2. The LED illumination system according to claim 1, wherein the leading and trailing edges of the square-shape LED current envelope are synchronous with the edges of the signal envelope.

3. The LED illumination system according to claim 1, wherein when the voltage level of the signal envelope is below a threshold voltage, the load compensation circuitry enables a current sink to compensate an insufficient LED driver current delivered at the output of the bridge rectifier.

4. The LED illumination system according to claim 1, wherein the load compensation circuitry enables a resistive current sink to compensate an insufficient LED driver current delivered at the output of the bridge rectifier, the resistive current sink comprising at least one resistor and a transistor that are biased in series between differential outputs of the diode rectifier, the transistor being switched on to enable a current through the at least one resistor when the level of the signal envelope is below the a threshold voltage.

5. The LED illumination system according to claim 4, wherein the load compensation circuitry further comprises:
   a resistive current sink, biased between differential outputs of the diode rectifier, the resistive current sink comprising at least one resistor and a transistor that are arranged in series; and
   a control circuit, coupled to the resistive current sink, the control circuit (1) controlling the transistor to respectively enable and disable a current through the at least one resistor when the level of the signal envelope is below and beyond the threshold voltage, and (2) controlling a response time at each leading edge of the signal envelope within a predetermined level.

6. The LED illumination system according to claim 1, wherein the load compensation circuitry responds within the first 50-100 μs of each leading edge of the LED current envelope that is synchronous with the signal envelope.

7. The LED illumination system according to claim 1, further comprising:
   a dimmer control, coupled at an input of the electronic transformer, the dimmer control controlling the magnitude of the LED current and a corresponding power delivered to drive the LED.

8. The LED illumination system according to claim 1, wherein the LED current is generated from the rectified second AC supply based on a closed-loop configuration that is selected from a boost configuration and a SEPIC configuration, and wherein the closed-loop configuration further comprises:
   a sensing resistor that is coupled in a returning path of the LED current to the bridge rectifier;
   a controller, coupled to the sensing resistor, the controller sensing a bias across the sensing resistor and generating a switch control voltage; and
   a switching transistor, coupled to the controller, the switching transistor controlling the LED current according to the switch control voltage.

9. A method of generating a LED current to drive a LED, comprising:
   converting a first AC supply to a second AC supply that is contained within a signal envelope using an electronic transformer, wherein the frequency of the signal envelope is substantially equal to that of the first AC supply; and
   providing full-wave rectification to the second AC supply;
   sensing and compensating the rectified second AC supply to compensate the load of the electronic transformer by adjusting a slew rate of at least one of leading and trailing edges the signal envelope, such that the electronic transformer starts up properly and maintains operational when the level of the signal envelope is below a threshold voltage; and coupling the rectified second AC supply to drive the LED.

10. The method according to claim 9, wherein the LED current is generated from the rectified second AC supply, and wherein a LED driver current is outputted upon rectification and contained in a square-shape current envelope that have its leading and trailing edges respectively synchronous with those edges of the signal envelope.

11. The method according to claim 9, wherein in the step of sensing and compensating the rectified second AC supply, a current sink is enabled to compensate an insufficient LED driver current that is generated upon rectification and coupled to drive the LED when the level of the signal envelope is below the threshold voltage.

12. The method according to claim 9, wherein the step of sensing and compensating the rectified second AC supply further comprises:
   biasing a resistive current sink between differential outputs of a bridge rectifier, the resistive current sink comprising at least one resistor and a transistor that are arranged in series;
   controlling the transistor to respectively enable and disable a current through the at least one resistor when the level of the signal envelope is below and beyond the threshold voltage; and
   controlling a response time at each leading edge of the signal envelope within a predetermined level.

13. The method according to claim 9, wherein in the step of sensing and compensating the rectified second AC supply, a response time of compensation is controlled within the first 50-100 μs of each leading edge of the LED current that is generated to drive the LED and controlled to be synchronous with the signal envelope.

14. The method according to claim 9, wherein a dimmer control is coupled at an input of the electronic transformer, and controls the magnitude of the LED current and a corresponding power delivered to drive the LED.

15. The method according to claim 9, wherein the LED is driven by the rectified second AC supply in a closed-loop configuration that is selected from a boost configuration and a SEPIC configuration, and wherein the closed-loop configuration comprises:
   a sensing resistor that is coupled in a returning path of the LED current to the bridge rectifier;
   a controller, coupled to the sensing resistor, the controller sensing a bias across the sensing resistor and generating a switch control voltage; and
   a switching transistor, coupled to the controller, the switching transistor controlling the LED current according to the switch control voltage.

16. A driver and current regulator, comprising:
   a bridge rectifier that provides full-wave rectification to an input AC supply, the input AC supply, contained in a signal envelope, being generated by an electronic transformer from a low-frequency AC supply, the frequency of the signal envelope being substantially equal to that of the low-frequency AC supply; and
   a load compensation circuitry, coupled to the bridge rectifier, the load compensation circuitry sensing the rectified input AC supply and compensating the load of the electronic transformer by adjusting a slew rate of at least one of leading and trailing edges of the low-frequency signal envelope, such that the electronic transformer starts up properly and maintains operational when the voltage level of signal envelope is lower than a threshold voltage.

17. The driver and current regulator according to claim 16, wherein when the level of the signal envelope is below the threshold voltage, the load compensation circuitry enables a current sink to compensate the load of the electronic transformer.

18. The driver and current regulator according to claim 16, wherein the load compensation circuitry enables a resistive current sink to compensate the load of the electronic transformer, the resistive current sink comprising at least one resistor and a transistor that are biased in series between differential outputs of the bridge rectifier, the transistor being switched on to enable a current through the at least one resistor when the level of the signal envelope is below the threshold voltage.

19. The driver and current regulator according to claim 16, wherein a LED current is generated from the rectified input AC supply based on a closed-loop configuration that is selected from a boost configuration and a SEPIC configuration, and wherein the closed-loop configuration further comprises:
   a sensing resistor that is coupled in a returning path of the LED current to the bridge rectifier;
   a controller, coupled to the sensing resistor, the controller sensing a bias across the sensing resistor and generating a switch control voltage; and
   a switching transistor, coupled to the controller, the switching transistor controlling the LED current according to the switch control voltage.

20. The driver and current regulator according to claim 19, further comprising:
   a dimmer control, coupled at an input of the electronic transformer, the dimmer control controlling the magnitude of the LED current and the corresponding power delivered to drive the LED.

* * * * *